(12) United States Patent
Kerfonta et al.

(10) Patent No.: US 10,579,622 B1
(45) Date of Patent: Mar. 3, 2020

(54) DATA MANAGEMENT SYSTEMS FOR PROCESSING ELECTRONIC DATA STORED AS A TABLE

(71) Applicant: Transdata Solutions, Inc., Sanford, NC (US)

(72) Inventors: Andy Kerfonta, Cary, NC (US); Eric Williamson, Willow Spring, NC (US)

(73) Assignee: Transdata Solutions, Inc., Sanford, NC (US)

( * ) Notice: Subject to any disclaimer, the term of this patent is extended or adjusted under 35 U.S.C. 154(b) by 680 days.

(21) Appl. No.: 15/147,318

(22) Filed: May 5, 2016

Related U.S. Application Data (60) Provisional application No. 62/193,290, filed on Jul. 16, 2015.

(51) Int. Cl.
*G06F 16/00* (2019.01)
*G06F 16/2455* (2019.01)
*G06F 16/25* (2019.01)

(52) U.S. Cl.
CPC ........ *G06F 16/24562* (2019.01); *G06F 16/25* (2019.01); *G06F 16/252* (2019.01)

(58) Field of Classification Search
CPC ......... G06F 17/30563; G06F 17/30554; G06F 17/30572; G06F 16/24562; G06F 16/25
USPC .................................................. 707/602, 608
See application file for complete search history.

(56) References Cited

U.S. PATENT DOCUMENTS

| | | | | |
|---|---|---|---|---|
| 2002/0184381 A1* | 12/2002 | Ryan | ...................... | H04L 49/10 709/234 |
| 2011/0078607 A1* | 3/2011 | Ryan | ...................... | G06Q 10/06 715/771 |
| 2011/0187730 A1* | 8/2011 | Jun | .......................... | G09G 3/36 345/545 |
| 2013/0311438 A1* | 11/2013 | Marquardt | ............ | G06F 16/282 707/706 |
| 2014/0372365 A1* | 12/2014 | Weyerhaeuser | .. | G06F 17/30592 707/602 |

OTHER PUBLICATIONS

Greg Larsen, Using the MERGE Statement to Perform an UPSERT, Apr. 12, 2014, Database Journal (Year: 2014).*

(Continued)

*Primary Examiner* — Thu Nguyet T Le
(74) *Attorney, Agent, or Firm* — MacCord Mason PLLC (57) ABSTRACT

A data management system for processing electronic files. The data management system includes at least one data source, the at least one data source having at least one column having one or more rows with alphanumerical values and, in one embodiment, at least two data input sets, the data input sets having one or more columns, each column having one or more rows with alphanumerical values, each alphanumerical value having a label associated with that alphanumerical value alone. At least one data transformation node is adapted for "pulling" from one of the at least one data input sets and performing an operation on that data input set. A node independent data result is created, wherein the node independent data result comprises an output of the operation of at least one data transformation node on the at least one data input set and associated labels from one data input set.

62 Claims, 7 Drawing Sheets

(56) References Cited

OTHER PUBLICATIONS

Chris Fehity, Summarizing and Grouping Data in SQL, Jan. 31, 2003, PeachPit. (Year: 2003).*
Greg Larsen, T-SQL Programming Part 9—Using the Merge Statement to Perform an UPSERT, Dec. 4, 2014, Database Journal, pp. 1-6 (Year: 2014).*
Alteryx Designer Analytics Program Data Sheet; printed from the internet Aug. 9, 2016.
SAS Clinical Data Integration Program Fact Sheet; printed from the internet Aug. 9, 2016.
Talend Data Preparation Free Desktop Manual; copyright 2016.
Alteryx Designer Product Web Page; "http://www.alteryx.com/products/alteryx-designer" Aug. 9, 2016.
SAS Clinical Data Integration Program Web Page; "http://www.sas.com/en_us/industry/life-sciences/clincial-data-integration.html" copyright 2014.
Talend Data Preparation Product Web Page; "https://www.talend.com/products/data-preparation" copyright 2016.

* cited by examiner

DATA MANAGEMENT SYSTEMS FOR PROCESSING ELECTRONIC DATA STORED AS A TABLE

This application claims the benefit of Provisional Application 62/193,290 filed Jul. 16, 2015.

BACKGROUND OF THE INVENTIONS

(1) Field

The present inventions relates generally to data management systems and, more particularly, to a data management system for data sources including electronic files, databases and manual input.

(2) Related Art

Spreadsheets have been common place in businesses for 40 years. The spreadsheet is populated with data. The user puts a calculation transform on to the data and the data changes in some way. Similarly in databases, the user gives it a calculation, it does it on that, the result is there. However, the designs of spreadsheets and databases was for efficient storage of data and not for the efficient transformation of data that can be monitored and understood easily by human beings. For example here, if the user has a table in a database and the user wants to make a change to it, if the user makes that change, unless the user made a backup, he just lost the original view. Which means if the user wanted something else and needed that original view, the user was out of luck.

Thus, there remains a need for a new and improved a data management system for data sources including electronic files, databases and manual input which is adapted to be monitored and understood easily by human beings while, at the same time, maintains the integrity of the original data.

SUMMARY OF THE INVENTIONS

The present inventions are directed to a data management system for processing electronic files. The present inventions are necessarily rooted in computer technology in order to overcome problems specifically arising in the realms of data management and manipulation, such as maintaining the integrity of data sources and data inputs during processing, and have no known analog outside the realm of computer technology. The data management system includes at least one data source, the at least one data source having at least one column having one or more rows with alphanumerical values and, in one embodiment, at least two data input sets, the data input sets having one or more columns, each column having one or more rows with alphanumerical values, each alphanumerical value having a label associated with that alphanumerical value alone. At least one data transformation node is adapted for "pulling" from one of the at least one data input sets and performing an operation on that data input set. An "initial pointer" goes from the at least one data transformation node to the at least one data input set.

A node independent data result is created, wherein the node independent data result comprises an output of the operation of at least one data transformation node on the at least one data input set and associated labels from one data input set. An "output pointer" goes from the at least one data transformation node to the node independent data result and an "input pointer" goes from the at least one data transformation node to the node independent data result.

At least one data transformation node is adapted for "pulling" from at least two of the at least one data input sets and performing an operation on those data input sets "forming" a data merger node in one embodiment, wherein the one data merger node is adapted to merge data from one data input set with data from another data input set. A first "initial pointer" goes from the at least one data merger node to one data input set.

A second "initial pointer" goes from the at least one data merger node to another data input set. A data merger node independent data result is created, wherein the data merger node independent data result comprises at least a portion of the alphanumerical values and associated labels from one data input set and at least a portion of the alphanumerical values and associated labels from another data input set. An "output pointer" goes from the at least one data merger node to the node independent data result.

The data management system may further include a user interface.

In one embodiment, at least one of the first "initial pointer" and the second "initial pointer" is from the at least one data merger node to the data result input.

In one embodiment, the at least one data merger node adapted to merge data from one data input set with data from another data input set includes (a) taking at least one label from one data source; (b) finding a matching label from another data source; and (c) combining the alphanumerical values of both data sources that are associated with the matching labels into the node independent data result.

In one embodiment, the at least one data merger node is further adapted to append data from one data input set with data from another data input set.

In one embodiment, the system further includes an "input pointer" from another data transformation node to the data merger node independent data result.

In one embodiment, the system further includes at least one data transformation node for "pulling" from one of the at least one data input sets and performing an operation on that data input set "fainting" a reference node. The reference node may include organizing data input sets. In one embodiment, the data input sets are organized in a hierarchy.

In one embodiment, the node independent data result further includes an optimization module. The optimization module may be a Monte-Carlo-type.

In one embodiment, each data input set and data merger node independent data result is stored at a memory address.

In one embodiment, the first initial pointer contains the memory address of the first data input set and the second initial pointer contains the memory address of the second data input set, the first initial pointer directing the data merger node to the memory address of the first data input set, the second initial pointer directing the data merger node to the memory address of the second data input set.

In one embodiment, the output pointer contains the memory address of the data merger node independent data result, the output pointer directing the merger node to the memory address of the data merger node independent data result.

The user interface may be a "flow chart" view. The "flow chart" view may include a data view. The data view may further include clicking on an icon representing the data transformation node to view the data input set.

The "flow chart" view may further include click and drag building. In one embodiment, the click and drag building includes (a) "creating" icons to represent the at least one data input set and the at least one data transformation node, the icons capable of movement and placement around a workspace and (b) "creating" connections between two or more icons, the connections representing a pointer.

The user interface may further include a "command line". In one embodiment, the "command line" is script-based.

The user interface may further include a Super node, the super node comprising two or more data transformation nodes.

In one embodiment, the data source is selected from the group consisting of files, databases and manual input. The files may include Excel files, CSV files, and text files. The databases may be network databases. In one embodiment, the databases are local database. In one embodiment, the manual input is "typed" by user. In one embodiment, the manual input is "piped" from another application.

In one embodiment, at least one data input set is a data result input, the data result input is the node independent data result from at least one data transformation node.

In one embodiment, the node independent data result is "piped" to another application.

In one embodiment, the data source further includes headers associated with each column, and the labels are imported from the headers.

Accordingly, one aspect of the present inventions is to provide a data management system for processing electronic files, the data management system including (a) at least one data source, the at least one data source having at least one column having one or more rows with alphanumerical values; (b) at least one data input set, the at least one data input set further including one or more labels corresponding to the alphanumerical value of each row of the column; (c) at least one data transformation node for "pulling" from one of the at least one data input sets and performing an operation on that data input set; (d) an "initial pointer" from the at least one data transformation node to the at least one data input set; (e) a node independent data result, wherein the node independent data result comprises an output of the operation of at least one data transformation node on the at least one data input set and associated labels from one data input set; (f) an "output pointer" from the at least one data transformation node to the node independent data result; and (g) an "input pointer" from the at least one data transformation node to the node independent data result.

Another aspect of the present inventions is to provide a data management system for processing electronic files with at least one data source, the data management system including (a) at least two data input sets, the data input sets having one or more columns, each column having one or more rows with alphanumerical values, each alphanumerical value having a label associated with that alphanumerical value alone; (b) at least one data transformation node for "pulling" from at least two of the at least one data input sets and performing an operation on those data input sets "forming" a data merger node, wherein the one data merger node is adapted to merge data from one data input set with data from another data input set; (c) a first "initial pointer" from the at least one data merger node to one data input set; (d) a second "initial pointer" from the at least one data merger node to another data input set; (e) a data merger node independent data result, wherein the data merger node independent data result comprises at least a portion of the alphanumerical values and associated labels from one data input set and at least a portion of the alphanumerical values and associated labels from another data input set; and (f) an "output pointer" from the at least one data merger node to the data merger node independent data result.

Still another aspect of the present inventions is to provide a data management system for processing electronic files, the data management system including (a) at least one data source, the at least one data source having at least one column having one or more rows with alphanumerical values; (b) at least two data input sets, the data input sets having one or more columns, each column having one or more rows with alphanumerical values, each alphanumerical value having a label associated with that alphanumerical value alone; (c) at least one data transformation node for "pulling" from one of the at least one data input sets and performing an operation on that data input set; (d) a first "initial pointer" from the at least one data transformation node to the at least one data input set; (e) a node independent data result, wherein the node independent data result comprises an output of the operation of at least one data transformation node on the at least one data input set and associated labels from one data input set; (f) a first "output pointer" from the at least one data transformation node to the node independent data result; and (g) an "input pointer" from the at least one data transformation node to the node independent data result; (h) at least one data transformation node for "pulling" from at least two of the at least one data input sets and performing an operation on those data input sets "forming" a data merger node, wherein the one data merger node is adapted to merge data from one data input set with data from another data input set; (i) a second "initial pointer" from the at least one data merger node to one data input set; (j) a third "initial pointer" from the at least one data merger node to another data input set; (k) a data merger node independent data result, wherein the data merger node independent data result comprises at least a portion of the alphanumerical values and associated labels from one data input set and at least a portion of the alphanumerical values and associated labels from another data input set; (l) a second "output pointer" from the at least one data merger node to the node independent data result; and (h) a user interface.

These and other aspects of the present inventions will become apparent to those skilled in the art after a reading of the following description of embodiments when considered with the drawings.

DESCRIPTION OF THE EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
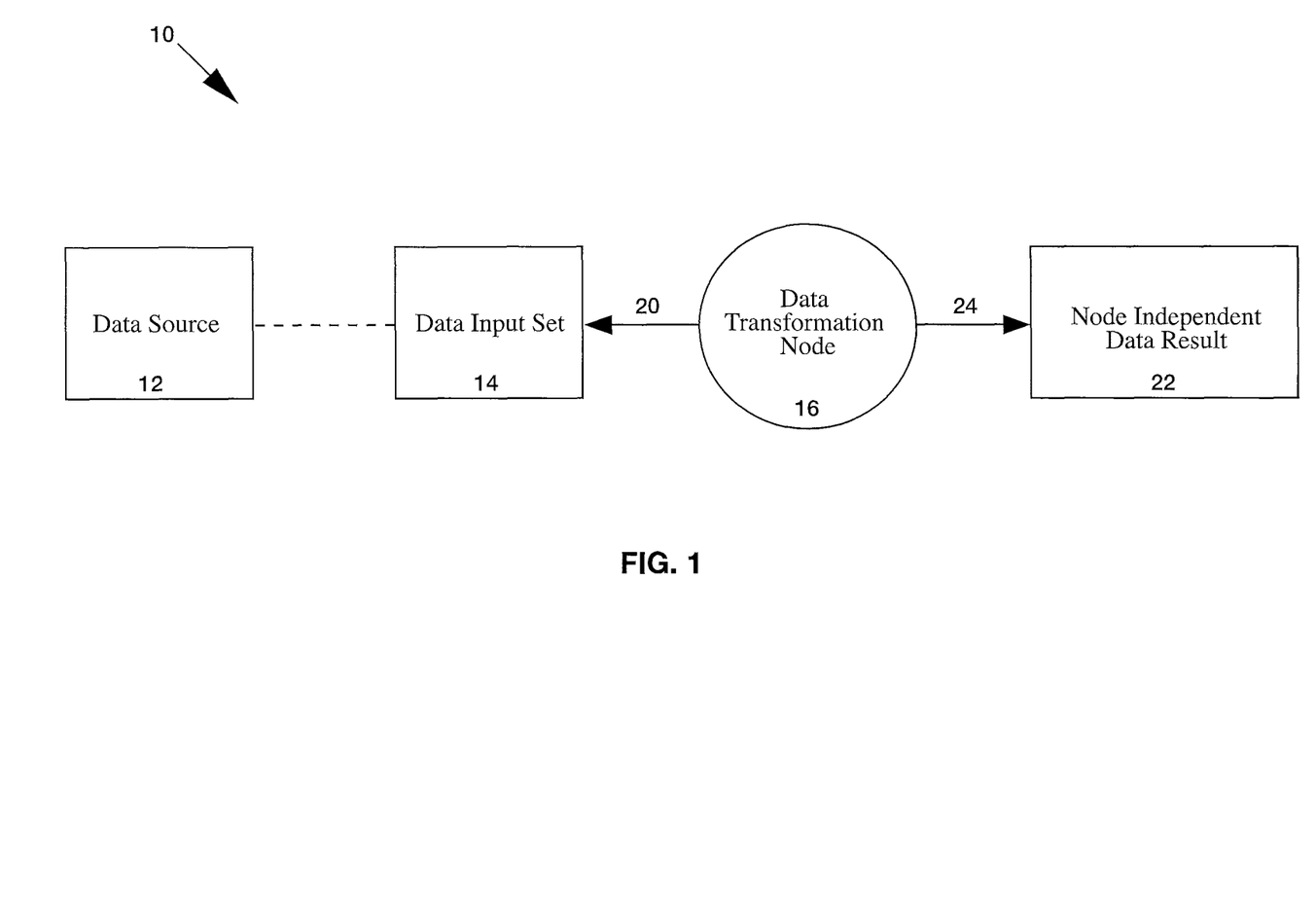
FIG. 1 is a schematic diagram illustrating one embodiment of a data management system constructed in accordance with the present inventions.

Referring now to the drawings in general and FIG. 1 in particular, it will be understood that the illustrations are for the purpose of describing a preferred embodiment of the inventions and are not intended to limit the inventions thereto. As best seen in FIG. 1, a data management system, generally designated 10, is shown constructed according to the present inventions. In a simple representation, as shown in FIG. 1, the data management system 10 includes a data source 12, a data input set 14, a data transformation node 16, an initial pointer 20, a node independent data result 22 and an output pointer 24.

Figure 2A:
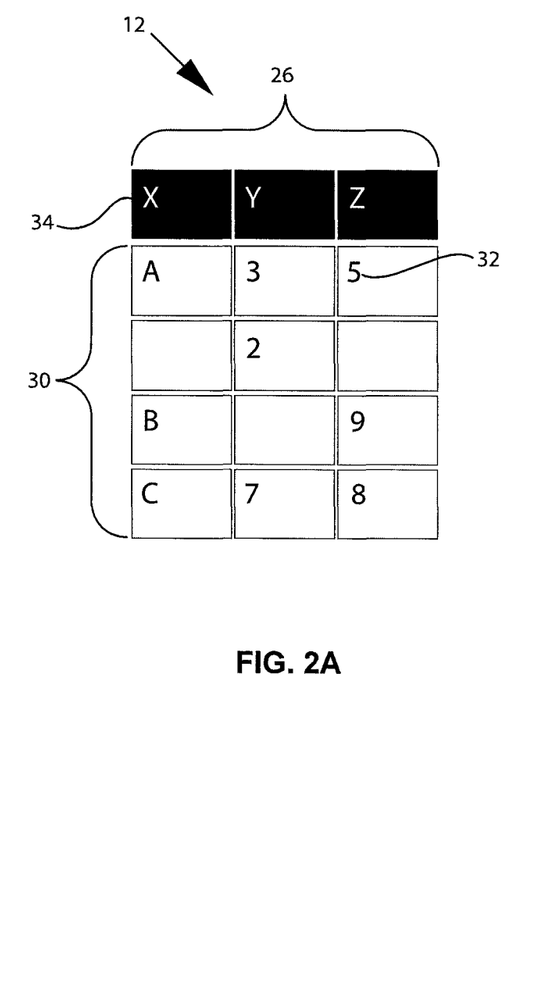
FIG. 2A is a schematic diagram illustrating one embodiment of a data source.

More than one data source 12 may be used by a data management system 10. As shown in FIG. 2A, data source 12 includes at least one column 26 having one or more rows 30. Each row within a column typically has an alphanumerical value 32, but could also be blank and contain no value. Alternatively, one or more rows from a column may contain data that is not necessarily represented by an alphanumerical value. Each column may also be defined by header 34. In other embodiments, each row may also include headers.

Data source 12 may be any type of file format, such as an Excel file, CSV file or text file. Alternatively, data source 12 may be manually inputted into the data management system 10. In some embodiments, data source 12 is manually inputted by the user. In other embodiments, data source 12 can be piped in from another application as further discussed below. Yet in other embodiments, data source 12 may be a database. The database may be a local database or a network database.

Figure 2B:
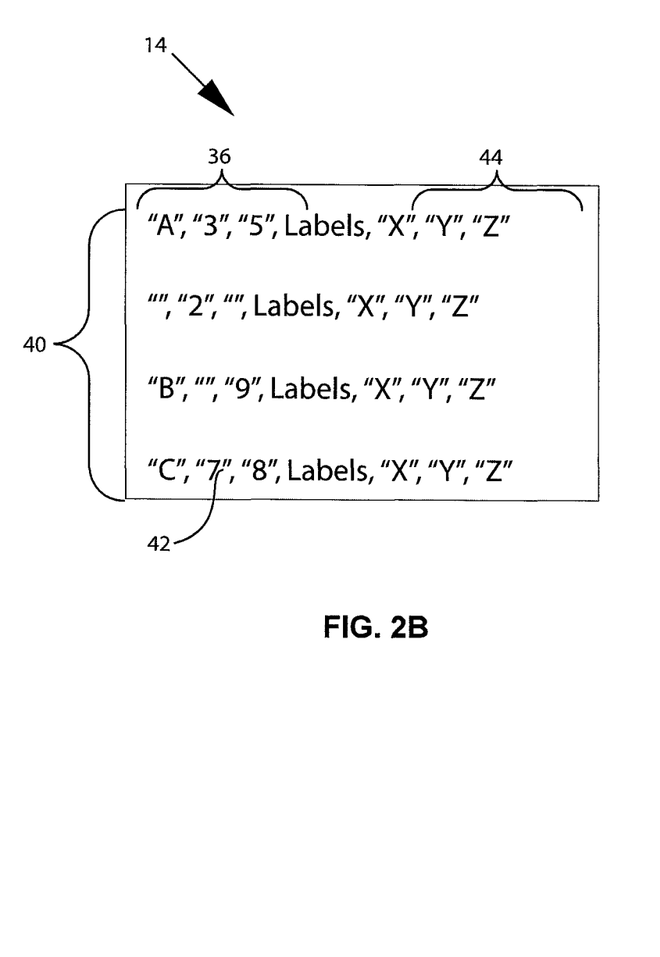
FIG. 2B is a schematic diagram illustrating one embodiment of a data input set.

Data management system 10 includes at least one data input set 14. FIG. 2B shows one embodiment of data input set 14. Data input set 14 includes at least one column 36 having one or more rows 40. Each row within a column typically has an alphanumerical value 42, but could also be blank and contain no value. Alternatively, one or more rows from a column may contain data that is not necessarily represented by an alphanumerical value. Each row within a column may also be defined by one or more labels 44. Each label may be a numerical value. In other embodiments, labels 44 may be an alphanumerical character manually inputted in by the user or another software application.

In the embodiment shown in FIG. 1, data input set 14 is derived from data source 12. Alphanumerical values from data source 12 may be exported into the columns 36 and rows 40 of data input set 14. Typically, headers 34 of data source 12 define each column, but not necessarily each row, as described above. As seen in the embodiment shown in FIGS. 2A and 2B, each alphanumerical value 42 of row 40 of data input set 14 imported from alphanumerical value 32 of row 30 of data source 12 will have a label 44 even though each row 30 of data source 12 does not have a label or header. Labels 44 may be imported from headers 34 of columns 30 of data source 12, as shown in FIGS. 2A and 2B. Each imported label 44 may still further include a numerical value. In such cases, a particular row of a particular column may be invoked by data management system 10 from either the numerical value associated with a particular label 44 or its imported header. Alternatively, in other embodiments, data source 12 may have no headers and labels 44 will only include numerical values. Still, in other embodiments, data input set 14 may be created within the data management system 10 itself without the need for data source 12.

Data transformation node 16 performs an operation on at least one data input set 14 to produce an output stored as a node independent data result 22. As used by those of ordinary skill within the art, the term "node" typically refers to a passive intersection in a graph that does not perform operations. Moreover, a graph does not usually have data moving through it. Rather, graphs are typically used to represent data and its structure. As used herein, the term "node" may refer to a representation on a graph. However, the term "node" deviates from its commonly understood meaning by having the capability to perform operations on the data represented by a graph. The term "node" therefore refers to actual active objects (classes) that may comprise an intersection within a graph, as opposed to simple passive intersections where no operation is performed on a data input set.

Operations performed by data transformation node 16 may be pre-programmed into the data management system. Data management system 10 may also include the capability for users to create their own operations for data transformation node 16 to perform. Operations performed by data transformation node may be of any type, and are not intended to be limited in any way. In some embodiments, the operations are mathematical operations. Some examples of mathematical operations that can be performed on data input set 14 include (but are not limited to): averaging, summing, integrating, calculating standard deviations, etc. Other operations may include filtering or sorting functions such as sorting alphabetically or by value. Operations may also be any form of text manipulation, such as splicing, appending, switching, copying, etc. Other types of operations may include searching, randomizing or filtering. Operations are not limited to being performed on the alphanumerical values 42 of data input set 14. Operations may be performed on labels 44, such as assigning or renaming labels 44. Data input set 14 may further include metadata, and operations may be performed on such metadata. Furthermore, operations may further include the capability of adding metadata, such as time values. Data transformation node 16 may also perform operations such as adding/removing columns or rows.

Data input set 14 is stored in a particular memory location with an associated address. In one embodiment, data input set 14 is stored locally on a device such as a computer. Other devices may include tablets, smartphones or other handheld portables. Data input set 14 may alternatively be stored on storage devices, such as a USB flash drive or CD-ROM. In other embodiments, data input set 14 may be stored elsewhere on a network. In the embodiment shown in FIG. 1, data transformation node 16 includes an initial pointer 20 to data input set 14. Initial pointer 20 references the memory location of data input set 14. Data transformation node 16 uses initial pointer 20 to pull data from data input set 14 and perform an operation on the pulled data. Output from the operation is stored at a particular memory location as a node independent data result 22. Data transformation node 16 further includes an output pointer 24 that references the memory location of node independent data result 22. Node independent data result 22 may be exported into any file format for viewing and analysis within another software application.

The basic structure of node independent data result 22 may be similar to data input set 14. Like data input set 14, node independent data result may include at least one column 36 having one or more rows 40. Each row within a column typically has an alphanumerical value 42, but could also be blank and contain no value. Alternatively, one or more rows from a column may contain data that is not necessarily represented by an alphanumerical value. Each row within a column may also be defined by label 44. Each label may be a numerical value. In other embodiments, labels 44 may be an alphanumerical character manually inputted in by the user or another software application.

Figure 3:
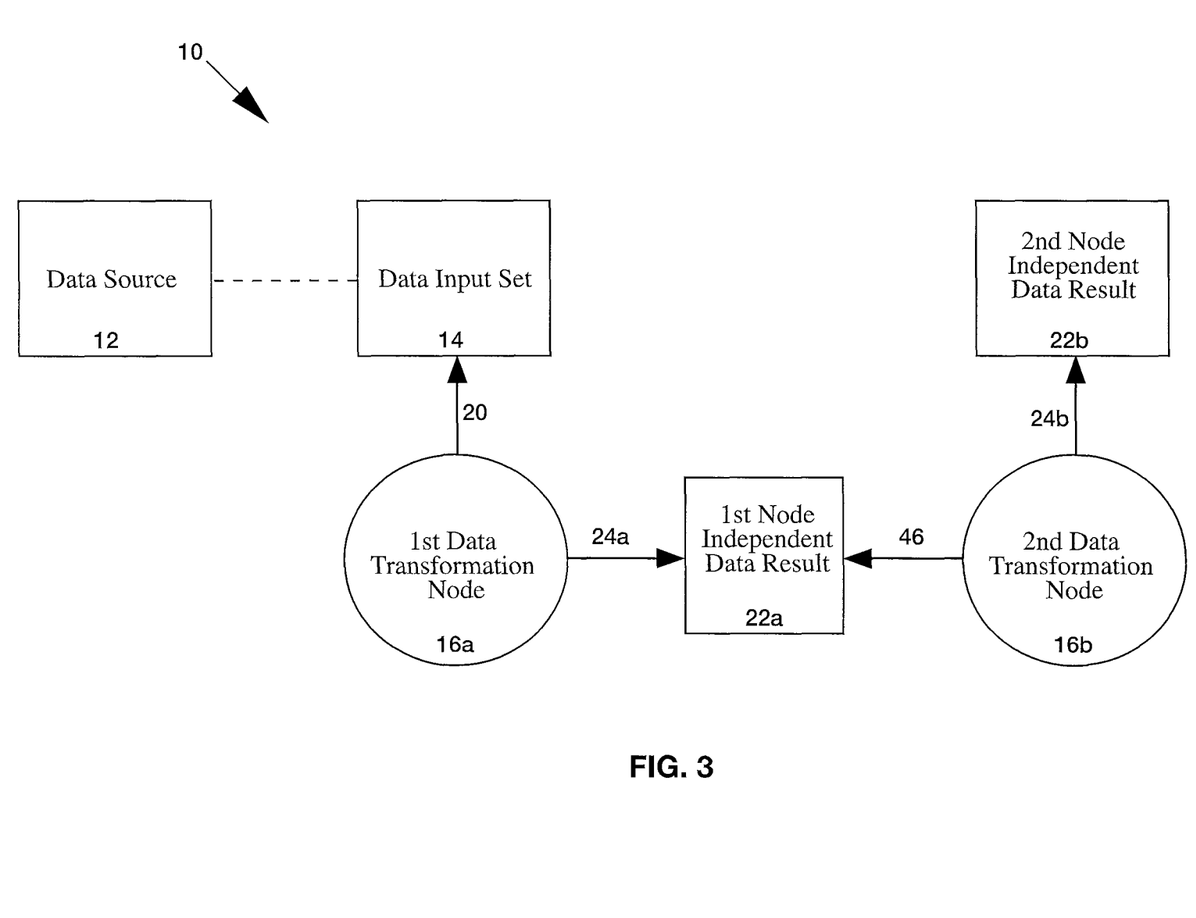
FIG. 3 is a schematic diagram illustrating another embodiment further including a second data transformation node and second node independent data result.

Typically, data management system 10 includes more than one data transformation node 16. FIG. 3 illustrates an embodiment of data management system 10 comprised of two data transformation nodes 16a, 16b. In the embodiment shown, data source 12 is converted into data input set 14. Data transformation node 16a includes an initial pointer 20 to data input set 14 and a first output pointer 24a to a first node independent data result 22a. The first node independent data result 22a is used as a data input for data transformation node 16b. Data transformation node 16b uses an input pointer 46 that references the memory location of first node independent data result 22a to pull data from first node independent data result 22a and perform an operation on the pulled data. Output from the operation is stored at a particular memory location as a second node independent data result 22b. Data transformation node 16b further includes a second output pointer 24b that references the memory location of the second node independent data result 22b. Node independent data results 22a, 22b may be exported into any file format for viewing and analysis within another software application. FIG. 3 is intended to illustrate that node independent data results may be used as input for subsequent data transformation nodes within data management system 10, and that the number of data transformation nodes and node independent data results are not limited within a given data management system.

Figure 4:
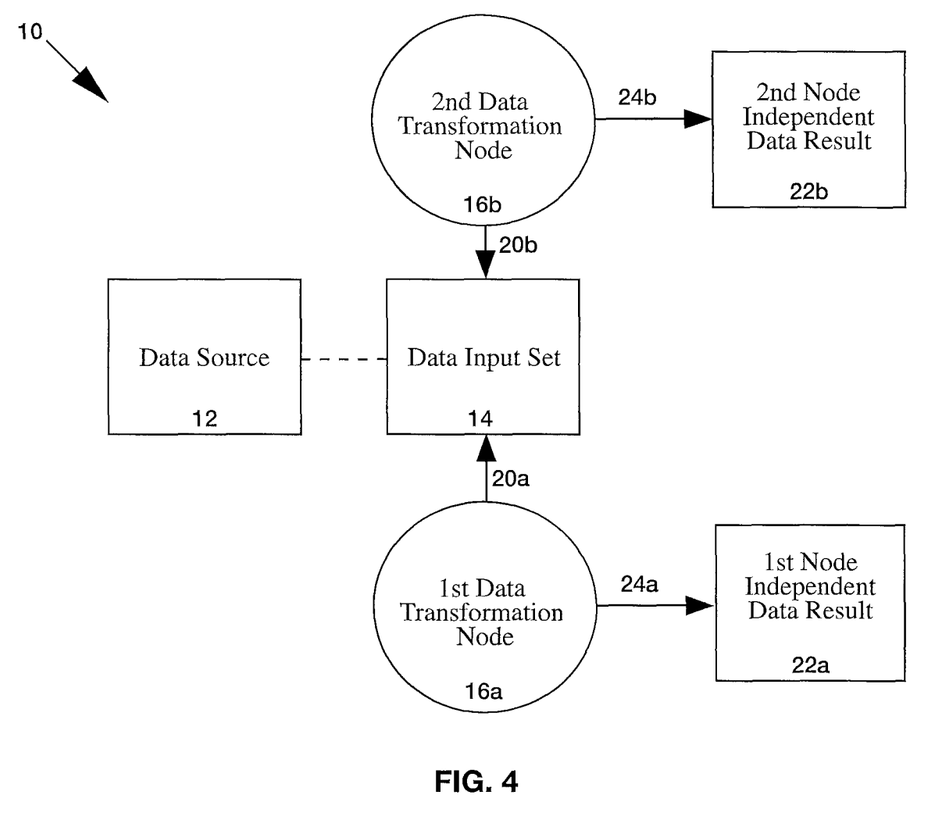
FIG. 4 is a schematic diagram illustrating yet another embodiment wherein two data transformation nodes each have an initial pointer to a data input set.

FIG. 4 illustrates another embodiment of data management system 10 comprised of two data transformation nodes 16a, 16b. In the embodiment shown, data source 12 is converted into data input set 14. Data transformation node 16a includes a first initial pointer 20a to data input set 14 and a first output pointer 24a to a first node independent data result 22a. Data transformation node 16b includes a second initial pointer 20b to data input set 14 and a second output pointer 24b to a second node independent data result 22b. FIG. 4 is intended to illustrate that data management system 10 may have more than one initial pointer for multiple data transformation nodes to perform operations on a data input set 14.

In yet another embodiment, data management system 10 may further include a data transformation node for pulling from one data input set and performing an operation on that data input set to form a reference node. Reference node may perform an organizing operation on a data input set or a node independent data result. In one embodiment, reference node organizes a data input set hierarchically.

Data management system 10 may further include a data transformation node that performs a merge operation. In one embodiment, the merge operation may be performed on two or more data input sets 14. In another embodiment, the merge operation may be performed on two or more or node independent data results 16. In yet other embodiments, the merge operation may be performed on a combination of one or more data input sets and one or more node independent data results.

The output of the merge operation is stored as a data merger node independent result 54, and may be comprised of at least a portion of the alphanumerical values and associated labels from one data input set (or node independent data result) and at least a portion of the alphanumerical values and associated labels from another data input set (or node independent data result). In one embodiment, the merge operation appends data from one data input set with data from another data input set. The merge operation may also be adapted to append data from one node independent data result with one or more data input sets or node independent data results.

In other embodiments, the merge operation may be adapted to merge data from one data input set (or node independent data result) with another data input set (or node independent data result) by taking at least one label from one data source, finding a matching label from another data source, and combining the alphanumerical values of both data sources that are associated with the matching labels into a data merger node independent data result. The merge operation may be further adapted to search for a matching label from multiple data sources.

Figure 5:
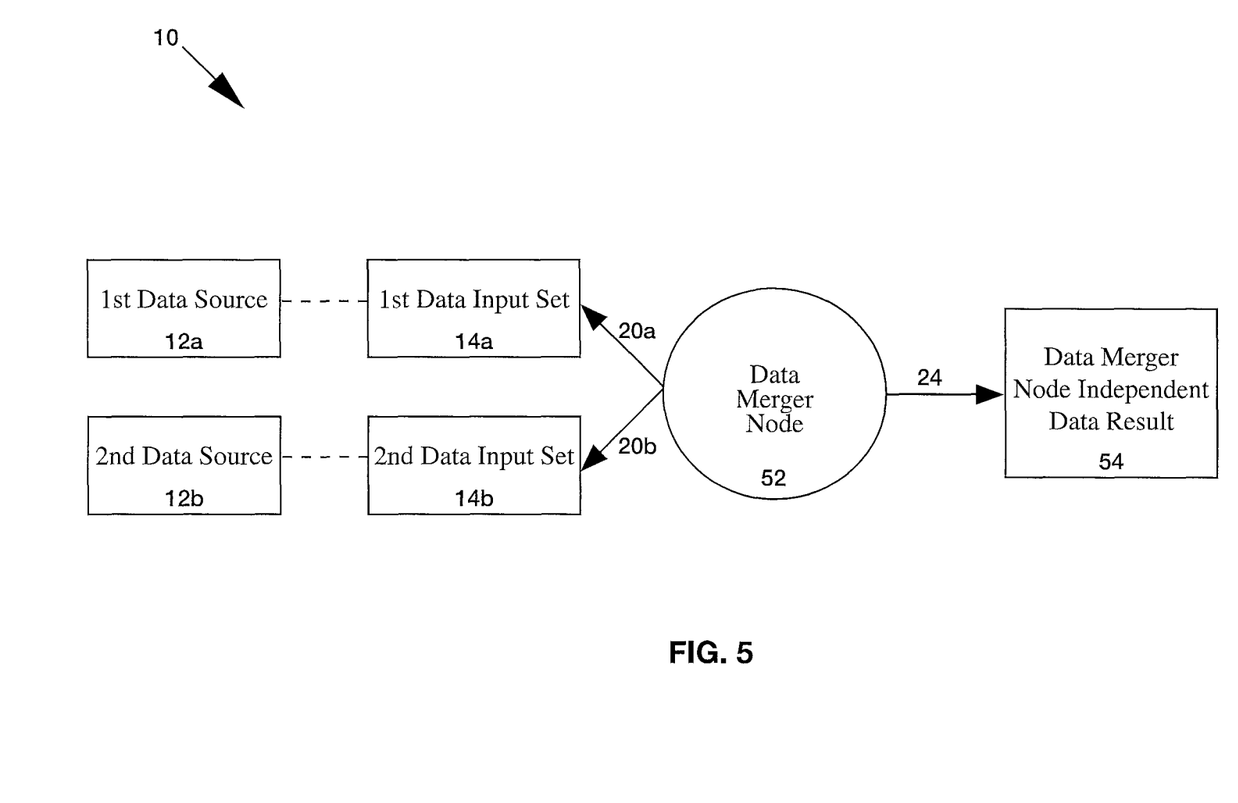
FIG. 5 is a schematic diagram illustrating an embodiment of a data transformation node forming a data merger node.

FIG. 5 shows an embodiment of data management system 10 further including a data merger node 52. In the embodiment shown, data source 12a is converted into a first data input set 14a. Data source 12b is converted into a second data input set 14b. Data merger node 52 includes a first initial pointer 20a to first data input set 14a. First initial pointer 20a references the memory location of data input set 14a. Data merger node 52 further includes a second initial pointer 20b to second data input set 14b. Second initial pointer 20b references the memory location of data input set 14b. Data merger node 52 uses initial pointers 20a, 20b to pull data from data input sets 14a, 14b and performs a merge operation on the data pulled from the data input sets 14a, 14b. Output from the operation is stored at a particular memory location as a data merger node independent data result 54. Data merger node 52 further includes an output pointer 24 that references the memory location of data merger node independent data result 54. In other embodiments, data merger node 52 may include additional initial pointers to additional data input sets.

Data merger node independent data result 54 may be exported into any file format for viewing and analysis within another software application. Alternatively, other operations may be performed on data merger node independent data result 54 by data transformation nodes 16 or additional data merger nodes 52. The basic structure of data merger node independent data result 54 is the same as node independent data result 22. It may include at least one column 36 having one or more rows 40. Each row within a column typically has an alphanumerical value 42, but could also be blank and contain no value. Alternatively, one or more rows from a column may contain data that is not necessarily represented by an alphanumerical value. Each row within a column may also be defined by label 44. Each label may be a numerical value. In other embodiments, labels 44 may be an alphanumerical character manually inputted in by the user or another software application.

Figure 6:
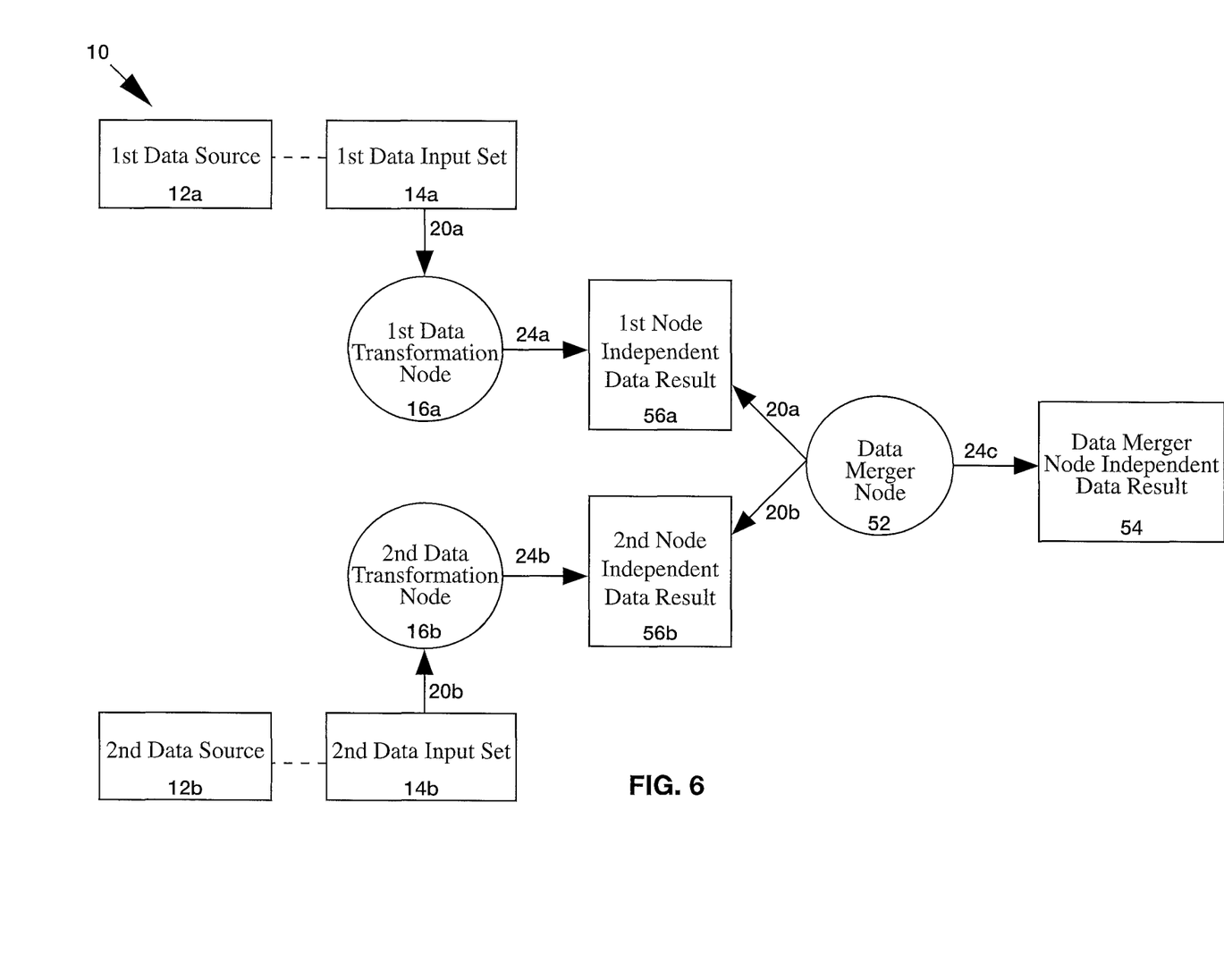
FIG. 6 is a schematic diagram illustrating another embodiment wherein a data merger node merges a first and second node independent data result.

FIG. 6 shows another embodiment of data management system 10 further including a data merger node 52. In the embodiment shown, first data source 12a is converted into a first data input set 14a. Second data source 12b is converted into a second data input set 14b. A first data transformation node 16a includes a first initial pointer 20a to first data input set 14a. First initial pointer 20a references the memory location of data input set 14a. First data transformation node 16a uses first initial pointer 20a to pull data from first data input set 14a and perform an operation on the pulled data. Output from the operation is stored at a particular memory location as a first data result input 56a. First data transformation node 16a further includes a first output pointer 24a that references the memory location of first data result input 56*a*. A second data transformation node 16*b* includes a second initial pointer 20*b* to second data input set 14*b*. Second initial pointer 20*b* references the memory location of second data input set 14*b*. Second data transformation node 16*b* uses second initial pointer 20*b* to pull data from second data input set 14*b* and perform an operation on the pulled data. Output from the operation is stored at a particular memory location as a second data result input 56*b*. Second data transformation node 16*b* further includes a second output pointer 24*b* that references the memory location of second data result input 56*b*. Data result inputs 56*a*,56*b* are akin to node independent data results.

Data merger node 52 includes a third initial pointer 20*c* to first data result input 56*a*. Third initial pointer 20*c* references the memory location of data result input 56*a*. Data merger node 52 further includes a fourth initial pointer 20*d* to second data result input 56*b*. Fourth initial pointer 20*d* references the memory location of second data result input 56*b*. Data merger node 52 uses initial pointers 20*c*, 20*d* to pull data from data result inputs 56*a*, 56*b* and performs a merge operation on the data pulled from the data result inputs 56*a*, 56*b*. Output from the operation is stored at a particular memory location as a data merger node independent data result 54. Data merger node 52 further includes an output pointer 24*c* that references the memory location of data merger node independent data result 54. In other embodiments, data merger node 52 may include additional initial pointers to additional data result inputs. Third and fourth initial pointers 20*c*, 20*d* may also be considered as input pointers.

FIGS. 5 and 6 are intended to show that data merger nodes may perform merge operations on node independent data results, data input sets, or the combination of the two types. Furthermore, other embodiments include performing merge operations on three or more data result input sets (or node independent data results).

Data management system 10 may further include an optimization module. In one embodiment, the node independent data result further includes an optimization module such as a Monte-Carlo-type optimization. The optimization module may be used to find a minimum, maximum or other user-desired value.

In accordance with one embodiment of the optimization module, the user may select one or more data input sets 14 and may select a node independent data result 22 derived from data input set 14. The node independent data result 22 selected by the user may be an output from a data transformation node directly using data input set 14 as an input. Alternatively, node independent data result 22 may be an output from a data transformation node wherein the data transformation node does not have an input pointer directly to a data input set, but rather another node independent result derived from the data input set. In yet another embodiment of the present invention, the user may select one or more data result inputs, and select a node independent data result. Other inputs and outputs are contemplated for use with the optimization module.

From the selection, the optimization module may iteratively generate new random data, wherein the random data generated is within a given percent variation from the user-selected values within a data input set or data result input. For each iteration, the optimization module will temporarily reassign the initial pointer from the data transformation node to a randomly generated value. The data transformation node performs an operation on that randomly generated value to produce a result from the randomly generated value, and the output pointer is temporarily reassigned to the result. The process may be repeated until the optimization module reaches a minimum, maximum, or other user-desired value. Once the optimization is completed, the results are reported to the user and all initial input and output pointers are reassigned to their respective original data input sets and node independent data results. In other embodiments of the optimization module using the Monte-Carlo method, randomly generated values may be used as input for a first data transformation node, wherein the result of that data transformation node may be used for one or more additional data transformation nodes prior to obtaining a final result for that iteration. In such embodiments, the pointers are to be reassigned accordingly.

In various embodiments, the data management system 10 includes a user interface. The user interface may be used to import data sources, generate data input sets, create pointers between data transformation nodes and generate node independent data results. The user interface may further include the capability of the user to generate a model, wherein the model may comprise a collection of data sources, data input sets, data transformation nodes and node independent data results. The model may be saved as a single file readable by the user interface.

Figure 7:
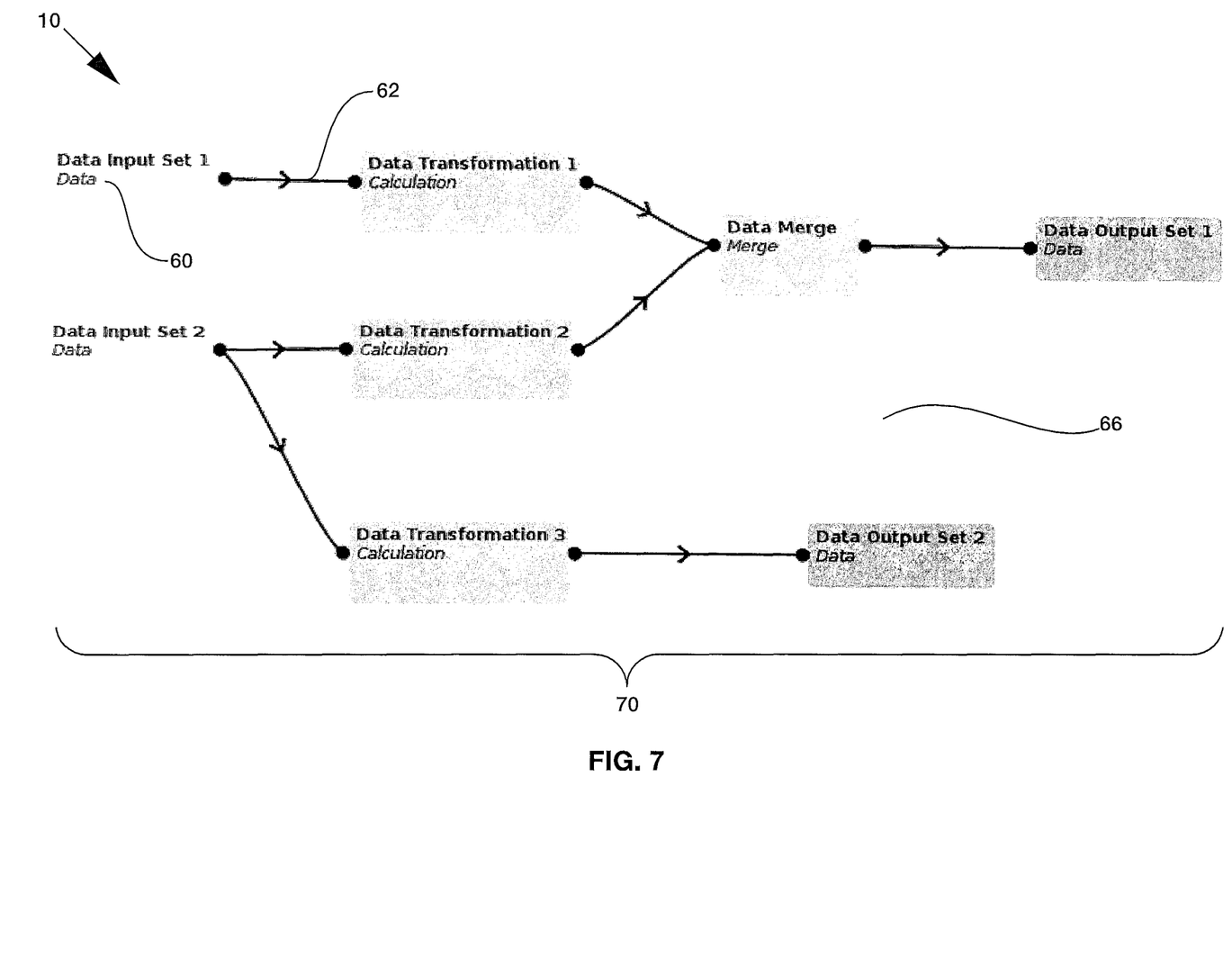
FIG. 7 is a screen shot showing a graphical user interface in accordance with one embodiment of the present inventions.

The user interface may simply be a command line invoked by a shell of a user's operating system. In other embodiments, the user interface is a graphical user interface. One embodiment of a graphical user interface may include a flow chart view of the data management system 10, as shown in FIG. 7. Each data source, data input set, data transformation node, and node independent data result may be represented by an icon 60, such as a labeled square or circle. Pointers may be represented by arrows. For the user's convenience, the arrows may point in a direction opposite of the pointers to resemble the orientation of a user's intended data flow. Therefore, although a data transformation node may include an input pointer to a node independent data result, the graphical user interface may represent the pointer as an arrow from the node independent data result to the data transformation node.

The graphical user interface of data management system 10 may further include a click and drag building toolset to construct a flow chart 70. Click and drag functionality may include the option for users to create icons representing a data source, data input set or data transformation node. Such functionality may further include the option for users to create connections between two or more icons. For instance, pointers from a node to a data input set (or node independent data result) may be created by clicking on one icon, dragging the mouse and releasing it on another icon. Alternatively, the user may create a connection by clicking on two icons, and the graphical user interface will generate a connection 62 between the two icons. Connection 62 may generally be illustrated as an arrow from data to a node to create the impression that data is being sent to a node as input. Icons 60 and connections 62 between icons may be freely moved and placed upon a workspace 66 within the graphical user interface. Click and drag functionality may be implemented on any type of device, such as a mouse, trackpad, trackball or stylus. In other embodiments, click and drag building may be implemented on a touch device, wherein clicking is performed by tapping or another mannerism on the touch device.

In an embodiment of the graphical user interface, a user may click on an icon 60 to view the data represented by that icon. A user may also click on a data transformation node icon to view the data input set (or node independent data result being used as input by the data transformation node).

This functionality may be one method that a user can ensure that a node is performing an operation on the correct data set. The user may also view that same data set by clicking on the icon representing that data input set or node independent data result. In some applications, multiple data transformation nodes may use a single data input set, and clicking on any one of those icons representing data transformation nodes or data input set will enable the user to view the data from that data input set. However, data management system 10 need not create new copies of that same data for each data transformation node, since each data transformation node has a pointer directing it to the data input set. Thus, there may be only one copy of a data input set even though a user may access it at any data transformation node in order to preserve memory. The data input set may be stored locally on the user's computer. In other embodiments, the data input set may be stored on another device and accessed over a network.

Clicking on the icon of a data transformation node may reveal additional details to the user, such as what operation is being performed on a particular data input set. In some embodiments, the user interface may further include a super node. The super node may be comprised of two or more data transformation nodes. In a graphical user interface, a user may click on an icon representing the super node to reveal additional icons representing each individual data transformation node. In other embodiments, super nodes may be organized such that clicking on one icon representing a super node may reveal icons representing additional super nodes.

The optimization module may be presented to the user as an overlay, wherein a pop-up window enables users to select one or more data input sets along with a node independent data result. The overlay may further include options for the type of optimization desired, such as selecting a minimum or maximum. A pop-up window may also be used to report the results from the optimization. Results from the optimization may be exported to another file format.

The graphical user interface may further include a command line. The command line may be used to generate icons and connections within the graphical user interface. The command line may include additional functionalities, such as importing/exporting files, managing file storage, communicating over a network, creating operations for a node to perform, modifying parameters for an optimization module, or editing a data input set. The command line may also be used to interact with the shell of a user's operating system. The command line may include shell-scripting capabilities that enable the data management system 10 to interact with other software applications. In certain embodiments, the command line interface is a completely separate interface from the graphical user interface. Files and models generated through the command line interface or graphical user interface may retain compatibility with each other.

In other embodiments, data management system 10 may interact with other software applications within the graphical user interface through the use of plug-ins. Plug-ins may be written for third-party software that enables exportation of that software's files to a file format readable by data management system 10. Such plug-ins may further include additional functions provided by data management system 10. Additional embodiments could include plug-ins within the graphical user interface of data management system 10 that are written for third-party software. Data management system 10 may further include an application programming interface (API) to aid developers in creating plug-ins for the graphical user interface of data management system 10 or other third-party software. APIs may also be used by developers to customize functionality within the data management system 10 itself.

Practical applications include managing logistics, tracking statistics and building predictive models. For example, the present inventions may be used by a large organization to manage data for various departments within the organization. Instead of having all information for every department accessible to all employees within a data file, various details may be hidden as necessary to make it easier for an individual or selected group of employees to view and to manipulate. For instance, information specific to one department may be viewable to employees within that department but hidden from others outside of that department. Although others may not be able to view all details of a model generated by that department, such as certain data sources, the model and node independent data results may still be viewable by others outside that department but still within the organization. For example, confidential salary and medical information may be viewed only by Human Resources but other employee information of a general nature, such as work experience and skills, may be generally available.

Certain modifications and improvements will occur to those skilled in the art upon a reading of the foregoing description. By way of example, the user may use the command line to pipe a model built with the presently described data management system for use in another application. The model may be built from the graphical user interface, but in other embodiments, can be built from the command line as well. The invention may also further include an application programming interface for piping purposes. Piping may also be done within the graphical user interface, such as through the use of plug-ins. Also, the present disclosure references various implementations of pointers. It is to be understood that "pointer" is a term of art related to referencing a particular address of data, and that in certain modifications, such as in assembly languages, other address modes may be used. Further, the address of the data may be stored locally on a computer or on a server, and may be transmitted through other means such as small talk messaging or threading. It should be understood that all such modifications and improvements have been deleted herein for the sake of conciseness and readability but are properly within the scope of the following claims.

We claim:

1. A data management system for processing electronic data stored as a table, said data management system comprising:
   a memory;
   a processor;
   (a) at least one in place data source, said at least one data source having at least one column having one or more rows with alphanumerical values;
   (b) at least one data input set, said at least one data input set further including one or more labels corresponding to one or more columns of said at least one in place data source, each label associated with the alphanumerical value of the column of each row, whereby each of the alphanumerical values of each column of each row of said input set are accessible by its corresponding label, whereby each row comprising list of one or more alphanumerical values and following list of one or more labels;
   (c) at least one data transformation node for pulling from one of said at least one data input sets in its entirety and performing an operation on that data input set;

(d) an initial pointer from said at least one data transformation node to said at least one data input set in its entirety;

(e) a node independent data result, wherein the node independent data result comprises an output of the operation of at least one data transformation node on said at least one data input set and associated labels from one data input set in its entirety;

(f) an output pointer from said at least one data transformation node to the start of said node independent data result and a second data transformation node for pulling the result from said node independent data result and performing an operation on said node independent data result; and (g) a second input pointer from said second data transformation node to said node independent data result.

2. The system according to claim 1, further including a user interface.

3. The system according to claim 2, wherein said user interface is a flow chart view.

4. The system according to claim 3, wherein said flow chart view includes a data view.

5. The system according to claim 4, wherein said data view further includes clicking on an icon representing said data transformation node to view the data input set.

6. The system according to claim 3, wherein said flow chart view further includes click and drag building.

7. The system according to claim 6, wherein said click and drag building includes
   (a) creating icons to represent the at least one data input set and the at least one data transformation node, said icons capable of movement and placement around a workspace; and
   (b) creating connections between two or more icons, said connections representing a pointer.

8. The system according to claim 2, wherein said user interface further includes a command line.

9. The system according to claim 8, wherein said command line is script-based.

10. The system according to claim 2, wherein said user interface further includes a Super node, said super node comprising two or more data transformation nodes.

11. The system according to claim 1, wherein said data source is selected from the group consisting of files, databases and manual input.

12. The system according to claim 11, wherein said files include Excel files, CSV files, and text files.

13. The system according to claim 11, wherein said databases are network databases.

14. The system according to claim 11, wherein said databases are local database.

15. The system according to claim 11, wherein said manual input is typed by a user.

16. The system according to claim 11, wherein said manual input is "piped" from another application.

17. The system according to claim 1, wherein at least one data input set is a data result input, said data result input is the node independent data result from at least one data transformation node.

18. The system according to claim 1, wherein the node independent data result is piped to another application.

19. The system according to claim 1, wherein said data source further includes headers associated with each column, and said labels are imported from said headers.

20. A data management system for processing electronic data stored as a table, said data management system having at least one data source, said at least one data source having at least one column having one or more rows with alphanumerical values, said data management system comprising:
   a memory;
   a processor;
   (a) at least two data input sets, said data input sets further including one or more labels corresponding to one or more columns of said at least one in place data source, each label associated with the alphanumerical value of the column of each row, whereby each of the alphanumerical values of each column of each row of said input set are accessible by its corresponding label, whereby each row comprising list of one or more alphanumerical values and following list of one or more labels;
   (b) at least one data merger node adapted to merge data from one data input set with data from another data input set, said data merger node adapted to pull from at least two of said at least two data input sets and perform a merging operation on those data input sets;
   (c) a first initial pointer from said at least one data merger node to one data input set;
   (d) a second initial pointer from said at least one data merger node to another data input set;
   (e) a data merger node independent data result, wherein the data merger node independent data result comprises at least a portion of the alphanumerical values and associated labels from one data input set and at least a portion of the alphanumerical values and associated labels from another data input set; and
   (f) an output pointer from said at least one data merger node to said data merger node independent data result and a data transformation node for pulling the result from said data merger node independent data result and performing an operation on said data merger node independent data result; and
   (g) a second input pointer from said data transformation node to said data merger node independent data result.

21. The system according to claim 20, wherein at least one of said first initial pointer and said second initial pointer is from said at least one data merger node to a data result input.

22. The system according to claim 20, wherein said at least one data merger node adapted to merge data from one data input set with data from another data input set includes
   (a) taking at least one label from one data source;
   (b) finding a matching label from another data source; and
   (c) combining the alphanumerical values of both data sources that are associated with the matching labels into the node independent data result.

23. The system according to claim 20, wherein said at least one data merger node is further adapted to append data from one data input set with data from another data input set.

24. The system according to claim 20, further including an input pointer from another data transformation node to the data merger node independent data result.

25. The system according to claim 20, further including at least one data transformation node for pulling from one of said at least one data input sets and performing an operation on that data input set forming a reference node.

26. The system according to claim 25, wherein said reference node includes organizing data input sets.

27. The system according to claim 26, wherein the data input sets are organized in a hierarchy.

28. The system according to claim 20, wherein said node independent data result further includes an optimization module.

29. The system according to claim 28, wherein said optimization module is a Monte-Carlo-type.

30. The system according to claim 20, wherein each data input set and data merger node independent data result is stored at a memory address.

31. The system according to claim 20, wherein the first initial pointer contains the memory address of the first data input set and the second initial pointer contains the memory address of the second data input set, said first initial pointer directing the data merger node to the memory address of the first data input set, said second initial pointer directing the data merger node to the memory address of the second data input set.

32. The system according to claim 20, wherein the output pointer contains the memory address of the data merger node independent data result, said output pointer directing the merger node to the memory address of the data merger node independent data result.

33. A data management system for processing electronic data stored as a table, said data management system comprising:
 a memory;
 a processor;
 (a) at least one data source, said at least one data source having at least one column having one or more rows with alphanumerical values;
 (b) at least two data input sets, said data input sets further including one or more labels corresponding to one or more columns of said at least one in place data source, each label associated with the alphanumerical value of the column of each row, whereby each of the alphanumerical values of each column of each row of said input set are accessible by its corresponding label, whereby each row comprising list of one or more alphanumerical values and following list of one or more labels;
 (c) at least one data transformation node for pulling from one of said at least two data input sets and performing an operation on that data input set;
 (d) a first initial pointer from said at least one data transformation node to said at least one data input set;
 (e) a node independent data result, wherein the node independent data result comprises an output of the operation of at least one data transformation node on said at least one data input set and associated labels from one data input set;
 (f) a first output pointer from said at least one data transformation node to said node independent data result and a second data transformation node for pulling the result from said node independent data result and performing an operation on said node independent data result;
 (g) a second input pointer from said second data transformation node to said node independent data result;
 (h) at least one data merger node adapted to merge data tram one data input set with data from another data input set, said data merger node adapted to pull from at least two of said at least two data input sets and perform a merging operation on those data input sets;
 (i) a second initial pointer from said at least one data merger node to one data input set;
 (j) a third initial pointer from said at least one data merger node to another data input set;
 (k) a data merger node independent data result, wherein the data merger node independent data result comprises at least a portion of the alphanumerical values and associated labels from one data input set and at least a portion of the alphanumerical values and associated labels from another data input set;
 (l) a second output pointer from said at least one data merger node to said data merger node independent data result; and
 (m) a user interface.

34. The system according to claim 33, wherein said user interface is a flow chart view.

35. The system according to claim 34, wherein said flow chart view includes a data view.

36. The system according to claim 35, wherein said data view further includes clicking on an icon representing said data transformation node to view the data input set.

37. The system according to claim 34, wherein said flow chart view further includes click and drag building.

38. The system according to claim 37, wherein said click and drag building includes
 (a) creating icons to represent the at least one data input set and the at least one data transformation node, said icons capable of movement and placement around a workspace; and
 (b) creating connections between two or more icons, said connections representing a pointer.

39. The system according to claim 33, wherein said user interface further includes a command line.

40. The system according to claim 39, wherein said command line is script-based.

41. The system according to claim 33, wherein said user interface further includes a Super node, said super node comprising two or more data transformation nodes.

42. The system according to claim 33, wherein said data source is selected from the group consisting of files, databases and manual input.

43. The system according to claim 42, wherein said files include Excel files, CSV files, and text files.

44. The system according to claim 42, wherein said databases are network databases.

45. The system according to claim 42, wherein said databases are local database.

46. The system according to claim 42, wherein said manual input is typed by user.

47. The system according to claim 42, wherein said manual input is piped from another application.

48. The system according to claim 33, wherein at least one data input set is a data result input, said data result input is the node independent data result from at least one data transformation node.

49. The system according to claim 33, wherein the node independent data result is piped to another application.

50. The system according to claim 33, wherein said data source further includes headers associated with each column, and said labels are imported from said headers.

51. The system according to claim 33, wherein at least one of said second initial pointer and said third initial pointer is from said at least one data merger node to a data result input.

52. The system according to claim 33, wherein said at least one data merger node adapted to merge data from one data input set with data from another data input set includes
 (a) taking at least one label from one data source;
 (b) finding a matching label from another data source; and
 (c) combining the alphanumerical values of both data sources that are associated with the matching labels into the node independent data result.

53. The system according to claim 33, wherein said at least one data merger node is further adapted to append data from one data input set with data from another data input set.

54. The system according to claim 33, further including a second input pointer from another data transformation node to the data merger node independent data result.

55. The system according to claim 33, further including at least one data transformation node for pulling from one of said at least one data input sets and performing an operation on that data input set forming a reference node.

56. The system according to claim 55, wherein said reference node includes organizing data input sets.

57. The system according to claim 56, wherein the data input sets are organized in a hierarchy.

58. The system according to claim 33, wherein said node independent data result further includes an optimization module.

59. The system according to claim 58, wherein said optimization module is a Monte-Carlo-type.

60. The system according to claim 33, wherein each data input set and data merger node independent data result is stored at a memory address.

61. The system according to claim 33, wherein the second initial pointer contains the memory address of the first data input set and the third initial pointer contains the memory address of the second data input set, said second initial pointer directing the data merger node to the memory address of the first data input set, said third initial pointer directing the data merger node to the memory address of the second data input set.

62. The system according to claim 33, wherein the second output pointer contains the memory address of the data merger node independent data result, said second output pointer directing the merger node to the memory address of the data merger node independent data result.

* * * * *